United States Patent
Kent et al.

(10) Patent No.: US 12,461,758 B2
(45) Date of Patent: Nov. 4, 2025

(54) RENDERING USER INTERFACES USING TEMPLATES

(71) Applicant: Apple Inc., Cupertino, CA (US)

(72) Inventors: Michael Kent, Sunnyvale, CA (US); David A. Schimon, San Francisco, CA (US); Neil N. Desai, San Francisco, CA (US); Robert M. Dhaene, Cupertino, CA (US); Devon P. Endicott, Sunnyvale, CA (US); August L. Joki, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 81 days.

(21) Appl. No.: 18/138,694

(22) Filed: Apr. 24, 2023

(65) Prior Publication Data

US 2023/0393864 A1    Dec. 7, 2023

Related U.S. Application Data

(60) Provisional application No. 63/349,030, filed on Jun. 3, 2022.

(51) Int. Cl.
*G06F 3/048* (2013.01)
*G06F 3/04842* (2022.01)
*G06F 3/04845* (2022.01)
*G06F 9/451* (2018.01)

(52) U.S. Cl.
CPC .......... *G06F 9/451* (2018.02); *G06F 3/04842* (2013.01); *G06F 3/04845* (2013.01)

(58) Field of Classification Search
CPC ... G06F 9/451; G06F 3/04842; G06F 3/04845
See application file for complete search history.

(56) References Cited

U.S. PATENT DOCUMENTS

| | | | |
|---|---|---|---|
| 9,104,886 B1* | 8/2015 | Dolbakian | G06F 21/62 |
| 2009/0007054 A1* | 1/2009 | Voss | G06F 9/451 |
| | | | 717/101 |
| 2010/0146384 A1* | 6/2010 | Peev | G06F 9/451 |
| | | | 715/255 |
| 2014/0351268 A1* | 11/2014 | Weskamp | G06F 16/24578 |
| | | | 715/251 |
| 2017/0060359 A1* | 3/2017 | Chaudhri | G06F 3/04845 |
| 2019/0129520 A1* | 5/2019 | Shin | H04N 23/00 |
| 2021/0281654 A1* | 9/2021 | Howett | H04L 67/535 |
| 2024/0231556 A9* | 7/2024 | Yang | G06F 9/451 |

* cited by examiner

*Primary Examiner* — Mahelet Shiberou
(74) *Attorney, Agent, or Firm* — BAKERHOSTETLER

(57) ABSTRACT

Systems and methods for rendering user interface views for electronic devices using templates are disclosed. In one or more implementations, an application process executing on a computing device accesses first application-specific content for presentation on a particular user interface. The system process determines that the first application-specific content is to be modified based on modification information specified by the application process. In response to the determination that the application-specific content is to be modified, the system process renders the particular user interface to include at least 1) a visual representation of other content of the particular user interface and 2) a visual representation of the first application-specific content as modified based on system state information of the computing device.

22 Claims, 8 Drawing Sheets

RENDERING USER INTERFACES USING TEMPLATES

CROSS REFERENCE TO RELATED APPLICATIONS

This application claims the benefit of priority to U.S. Provisional Patent Application No. 63/349,030, entitled "Rendering User Interface Using Templates," filed on Jun. 3, 2022, the disclosure of which is hereby incorporated herein in its entirety.

TECHNICAL FIELD

The present description relates generally to electronic devices, including, for example rendering, for electronic devices, user interfaces using templates.

BACKGROUND

Electronic devices may include applications that present information on a user interface of the application. Users may unlock the electronic device and interact with the application. However, the application may be able to present a restricted amount of information on a user interface on the electronic device while the electronic device is locked.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

In at least one illustrative implementation, a system process of an electronic device accesses application-specific content associated with an application of the electronic device. The system process further determines modification information associated with the application-specific content and determines, based on the modification information, the application-specific content is to be modified for presentation on a user interface of the electronic device. A user interface may be rendered on the electronic device, and the user interface may include a visual representation of the application-specific content modified based on system state information associated with the electronic device.

Figure 1:
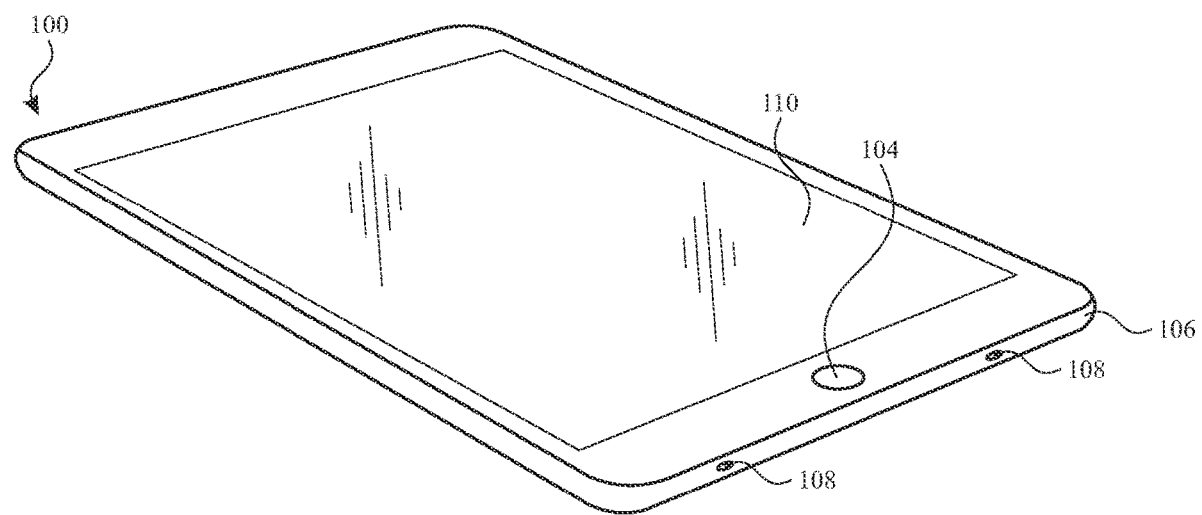
FIG. 1 illustrates a perspective view of an example electronic device that may implement various aspects of the subject technology.

An illustrative electronic device that may display content and/or dynamically resizable UI views as shown in FIG. 1. In the example of FIG. 1, electronic device 100 has been implemented using a housing that is sufficiently small to be portable and carried by a user (e.g., electronic device 100 of FIG. 1 may be a handheld electronic device such as a tablet computer, a smart phone, a smartwatch, a laptop, and the like). As shown in FIG. 1, electronic device 100 includes a display such as display 110 mounted on the front of housing 106. Electronic device 100 includes one or more input/output devices such as a touch screen incorporated into display 110, a button or switch such as button 104 and/or other input output components disposed on or behind display 110 or on or behind other portions of housing 106. Display 110 and/or housing 106 include one or more openings to accommodate button 104, a speaker, a light source, or a camera.

In the example of FIG. 1, housing 106 includes openings 108 on a bottom sidewall of housing 106. One or more of openings 108 forms a port for an audio component. Housing 106, which may sometimes be referred to as a case, may be formed of plastic, glass, ceramics, fiber composites, metal (e.g., stainless steel, aluminum, etc.), other suitable materials, or a combination of any two or more of these materials.

The configuration of electronic device 100 of FIG. 1 is merely illustrative. In other implementations, electronic device 100 may be a computer such as a computer that is integrated into a display such as a computer monitor, a laptop computer, a wearable device such as a smart watch, a pendant device, or other wearable or miniature device, a media player, a gaming device, a navigation device, a computer monitor, a television, a headphone, or other electronic equipment having a display. In some implementations, electronic device 100 may be provided in the form of a wearable device such as a smart watch. In one or more implementations, housing 106 may include one or more interfaces for mechanically coupling housing 106 to a strap or other structure for securing housing 106 to a wearer.

Figure 2:
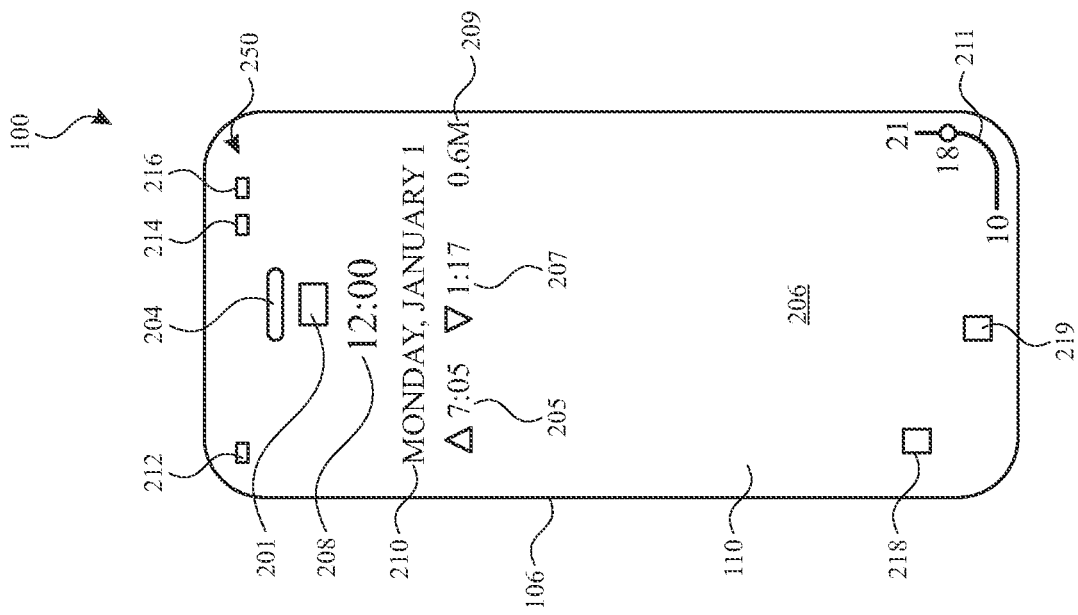
FIG. 2 illustrates an example computing device and user interface view in a first state, in accordance with one or more implementations.

FIG. 2 illustrates an example of an electronic device 100 displaying a particular user interface (UI) in a first state. In some embodiments, the particular UI is a system UI (e.g., a UI provided by an operating system of the electronic device 100). However, in some embodiments, the electronic device is configured to display the particular UI on any one of a lock screen (e.g., lock screen 250), a home screen, and the like. In one or more implementations, the particular UI may be a particular UI for a widget. The electronic device 100 may be further configured to present a visual representation of application-specific content on the particular UI. For example, the system process may cause rendering of the application-specific content to create the visual representation of the application-specific content. Additionally, in some embodiments the application-specific content may be modified to present a modified visual representation of the application-specific content.

As shown in FIG. 2, the lock screen 250 is displayed by the electronic device 100 while the electronic device 100 is in a locked state. For example, the electronic device 100 may include the housing 106 and the display 110 that displays the lock screen 250. In the example of FIG. 2, the lock screen 250 includes an unlock feature 219. The unlock feature 219 may be selectable by a user of the electronic device 100 to initiate an unlock procedure (e.g., a procedure in which the user provides and/or the device obtains authentication information to unlock the electronic device). In the example of FIG. 2, the lock screen 250 also includes a lock indicator 201 indicating that the electronic device is locked. In one or more implementations, when authentication information is received by the electronic device 100, and before the user provides an additional interaction to navigate away from the lock screen 250 (e.g., to another screen, such as a home screen or a user interface of an application or a system process), the lock indicator 201 may indicate that the electronic device 100 is unlocked for a period of time while the lock screen 250 continues to be displayed.

In the example of FIG. 2, the lock screen 250 also includes a carrier indicator 212, a signal strength indicator 214, a battery indicator 216, and a functional element 218 (e.g., a displayed element that can be used to access a limited functionality of the electronic device 100, such as a light source functionality or a camera functionality). As shown in FIG. 2, the lock screen 250 may also include a background 206 (e.g., an image or a pattern of colors) and the lock screen 250 may include publicly available data, such as a time 208 and a date 210. In the example of FIG. 2, the electronic device 100 includes one or more sensing components 204 (e.g., a camera and/or an infrared sensor or depth sensor) that can be used for obtaining biometric authentication information from a user of the electronic device. In other examples, the electronic device 100 may obtain biometric or non-biometric (e.g., passcode) authorization information from other sensors and/or input components, such as a touch screen integrated into the display 110, or a keyboard or other input interface of the electronic device 100.

In the example of FIG. 2, the particular UI includes a visual representation of application-specific content. For example, FIG. 2 shows a first element 205, a second element 207, a third element 209, and a fourth element 211 of the application-specific content. Each of the elements of application-specific content may be associated with a same application, or each of the elements of application-specific content may be associated with different applications, or any combination of the elements of application-specific content may be associated with the same or different applications. For example, the first element 205, the second element 207, and the third element 209 may each be associated with a same application (e.g., a tidal chart application), while the fourth element 211 may be associated with a second, different application (e.g., a temperature application).

In some variations, the visual representation of the application-specific content included on the particular UI may be static. In some variations, the visual representation of the application-specific content may be dynamic. For example, the fourth element 211 may update on a periodic basis to indicate a minimum daily temperature, a maximum daily temperature, and a current temperature associated with a geographic location of the electronic device 100. The fourth element 211 may update once every second, once every minute, once every hour, once every day, or after any other suitable time period.

While FIG. 2 describes an example including a first element 205, a second element 207, a third element 209, and a fourth element 211 of application-specific content, any number of elements may be displayed (e.g., three elements, two elements, one element, or more than four elements of application-specific content).

The elements of application-specific content may be persistently displayed on the particular UI (e.g., the lock screen 250). For example, the elements of application-specific content may always be displayed on the particular UI, along with the additional features displayed on the particular UI, for example the time 208 and the date 210.

Additionally, the elements of the visual representation of the application-specific content 205, 207, 209, and 211 may be modified based on system state information associated with the electronic device 100. For example, the background 206 may comprise a color, a theme, a picture, or the like. The application may specify modification information associated with the application-specific content to indicate that the visual representation of the application-specific content on the particular user interface should be modified based on the system state information. In one example, the visual representation of the application-specific content may be modified to match a color associated with the background 206 (e.g., the first element 207 may be modified to a same color, a complementary color, an opposite color, or the like, of the background 206).

Additionally, the application-specific content may be received from the application process with modification information associated with a first part of the application-specific content but not associated with a second part of the application-specific content. For example, the modification information may indicate that a first portion of a visual representation of the application-specific content rendered on the particular UI should be modified based on the system state information, while a second portion of the visual representation of the application-specific content rendered on the particular UI should not be modified based on the system state information. In one example, the first element 205 and the second element 207 may be modified based on the system state information, while the third element 209 may not be modified by the system state information. In another example, a border of the first element 205 may be modified based on the system state information while a core of the first element 205 may not be modified based on the system state information, or vice versa.

The system state information may indicate any number of features for use in modifying the visual representation of the application-specific content. For example, the system state information of the electronic device 100 used to modify the application-specific content may be associated with the background 206, such as a color, theme, or picture associated with the background 206. Additionally, the system state information may comprise one or more of: a default theme associated with the electronic device 100 other than the background 206 theme, a privacy state of the electronic device 100, a time of day, an amount of ambient light at a location associated with the electronic device 100, a font associated with text displayed on the particular user interface, such as a type of font displayed on the lock screen 250, or any number of other features associated with the electronic device.

In FIG. 2, the elements 205, 207, 209, and 211 may be rendered according to first system state information, such as based on a first color associated with the background 206. The rendered visual representation of the elements 205, 207, 209, and 211 may be updated based on an update to the system state information. For example, a user selection may change a background 206 color from a first color to a second color, and the elements 205, 207, 209, and 211 may be updated to be rendered based on the second color associated with the background 206. In an additional example, the background 206 may be associated with a picture. A user selection may change the picture to a different picture associated with the background 206, and the elements 205, 207, 209, and 211 may be updated to be rendered based on the different picture associated with the background 206.

The elements 205, 207, 209, and 211 merely represent examples of possible styles of visual representations of the application-specific content rendered on the particular UI. However, the elements shown in FIG. 2 are not exhaustive. For example, element 205 and element 207 show a shape, such as a triangle. Element 209 shows text and element 211 shows a curved shape, such as a slider. However, any number of shapes, objects, or text may be associated with the visual representation of the application-specific content. For example, the rendered element may be rectangular, circular, triangular, or any other shape. For example, the rendered element may follow a curve of an edge of the electronic device 100. For example, the rendered element may be configured to follow the bezel of the electronic device 100, such as a bezel of a watch or other wearable device.

The features shown in FIG. 2 may be displayed on a lock screen 250 UI associated with the electronic device 100. The lock screen 250 UI may be displayed in response to a lock event. For example, a user selection of a locking functionality may lock the electronic device and display the lock screen 250. A user selection may unlock the lock screen 250. Based on receiving, by the system process, an unlock event, the system process may unlock the phone and display a different UI than the lock screen 250. In another example, upon receiving an indication of the unlock event, the system process may not transition away from the lock screen 250 until an additional action is taken. For example, a user selection may unlock the system, and the lock screen 250 may continue to be displayed. Then, in response to an additional user selection to navigate away from the lock screen 250, a new, different, UI may be rendered on the electronic device 100. Additionally, while the electronic device 100 is in a locked state, some or all data associated with applications on the electronic device 100 may be in an encrypted state.

Figure 3:
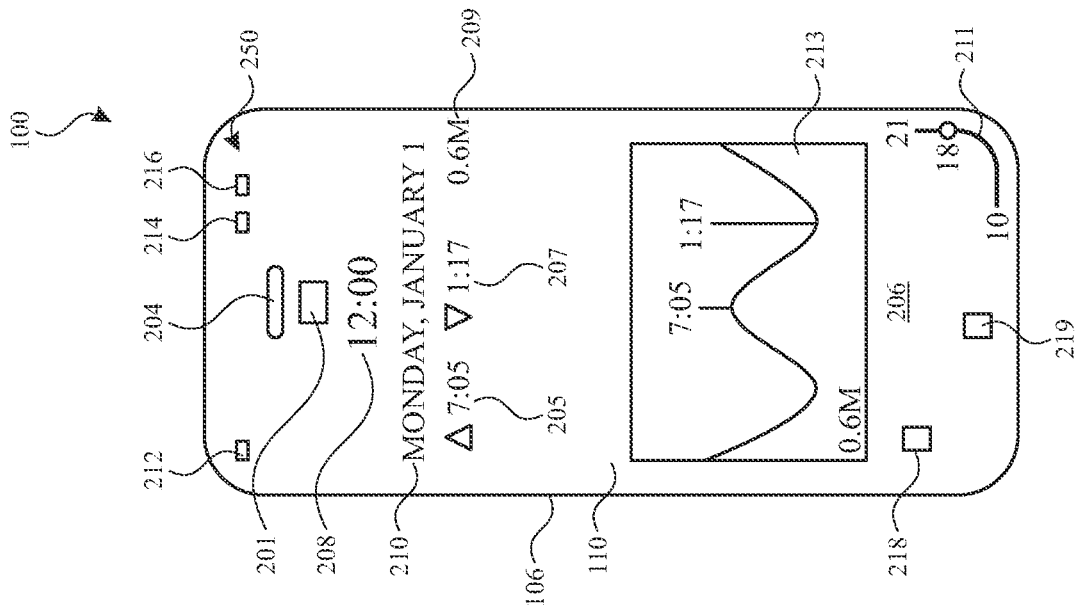
FIG. 3 illustrates an example computing device and user interface view in a second state, in accordance with one or more implementations.

In one or more implementations, the UI may include additional application-specific content that is not modified prior to rendering. For example, FIG. 3 illustrates an example in which the electronic device 100 displays the UI in a different state than the UI state described in FIG. 2. In the example of FIG. 3, the UI includes the same elements associated with the application-specific content as shown in FIG. 2, but FIG. 3 also shows an additional element 213 associated with the application-specific content. The element 213 may be associated with a same application as the other elements 205, 207, 209, and/or 211, or the additional element 213 may be associated with a different application not associated with any of the elements 205, 207, 209, or 211. In FIG. 3, for example, element 213 is associated with a same application as described in elements 205, 207, 209. For example, element 213 may show a tide chart graph showing the level of a tide over the course of a day, while the elements 205, 207, and 209 may show discrete pieces of the content described in the element 213. For example, element 205 may describe a time associated with a high-tide. However, the examples provided herein are merely illustrative.

The element 213 may include static content or it may include dynamic content. For example, the content may be updated on a periodic basis, or the content may not be updated. For example, a portion of the content in element 213 may be static and a different portion of the content in element 213 may be dynamic. The application may provide updated content, and the system process may render the updated content in any of elements 205, 207, 209, or 213 on a periodic basis.

In FIG. 3, while the content presented on the UI in element 213 may also be presented in elements 205, 207, and 209, there may also be additional content displayed in element 213 than what is displayed in elements 205, 207, and 209. For example, element 207 may display a time associated with a low tide. However, element 213 may display the time associated with the low tide, and element 213 may display the level of the low-tide at the time. In another implementation, element 213 may display less content than the content displayed in elements 205, 207, and 209. For example, element 209 may present a current level of a tide. While the level of the tide is shown in element 213 (e.g., 0.6 meters), in another implementation element 213 may not show the level of the tide.

In one or more implementations, the UI may transition between the UI described in FIG. 2 and the UI described in FIG. 3. For example, responsive to a user selection, the UI of FIG. 2 may transition to the UI of FIG. 3. The user selection may comprise a selection of any one or more of elements 205, 207, or 209, or the selection may be associated with any other action that indicates a user selection of the application associated with elements 205, 207, 209, and 213. For example, a user of the electronic device 100 may tap, swipe, or provide another input when the UI is in the state described in FIG. 2 to cause a display of element 213, as shown in FIG. 3.

In one or more implementations, the underlying application may provide state definitions that include trigger definitions for various triggers between various state combinations to determine which elements of the visual representations of the application-specific content to present on the lock screen 250 UI.

Figure 4:
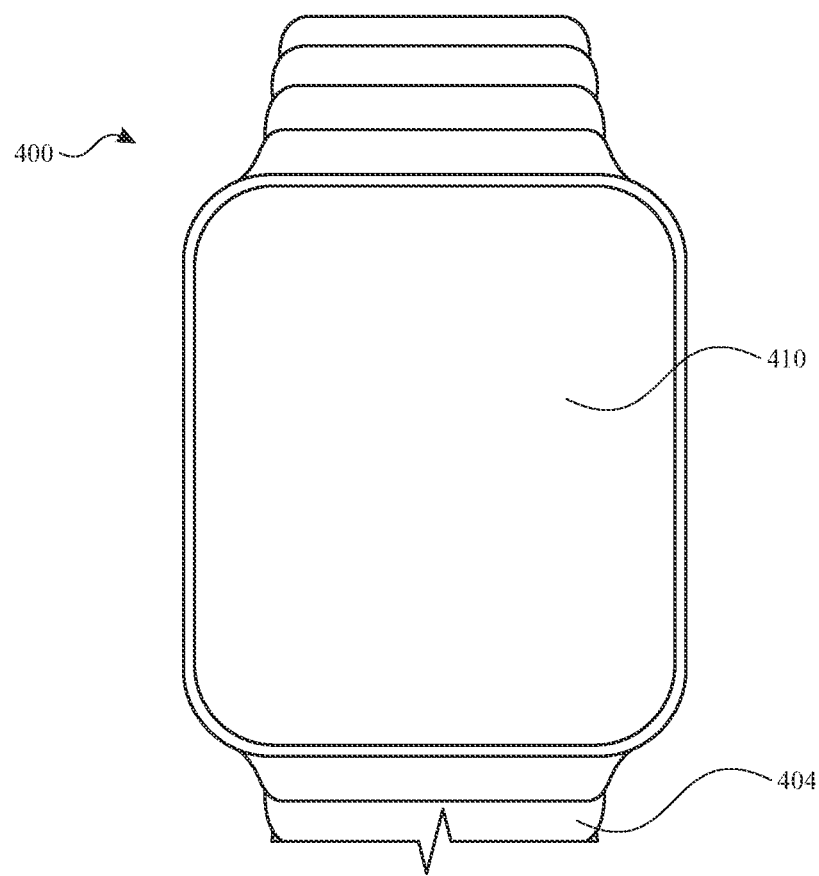
FIG. 4 illustrates an example wearable device that may implement various aspects of the subject technology.

FIG. 4 shows an example wearable electronic device, such as a smartwatch, on which the example processes may be implemented. As shown in FIG. 4, wearable electronic device 400 includes a display such as display 410. Wearable electronic device 400 includes one or more input/output devices such as a touch screen incorporated into display 410, a button or switch (not shown) such as a button on a side of the wearable electronic device, and/or other input output components disposed on or behind display 410. The wearable electronic device 400 may comprise a strap 404 configured to secure the wearable electronic device to a user. For example, the strap may secure the wearable electronic device 400 to the user's wrist.

The touchscreen may be formed of any material capable of transmitting electronic signals via touch, such as glass or plastic. The wearable electronic device 400 may also comprise a housing formed of plastic, glass, ceramics, fiber composites, metal (e.g., stainless steel, aluminum, etc.), other suitable materials, or a combination of any two or more of these materials. The strap 404 may be formed of any suitable material, such as rubber, leather, plastic, metal, or the like.

Figure 5:
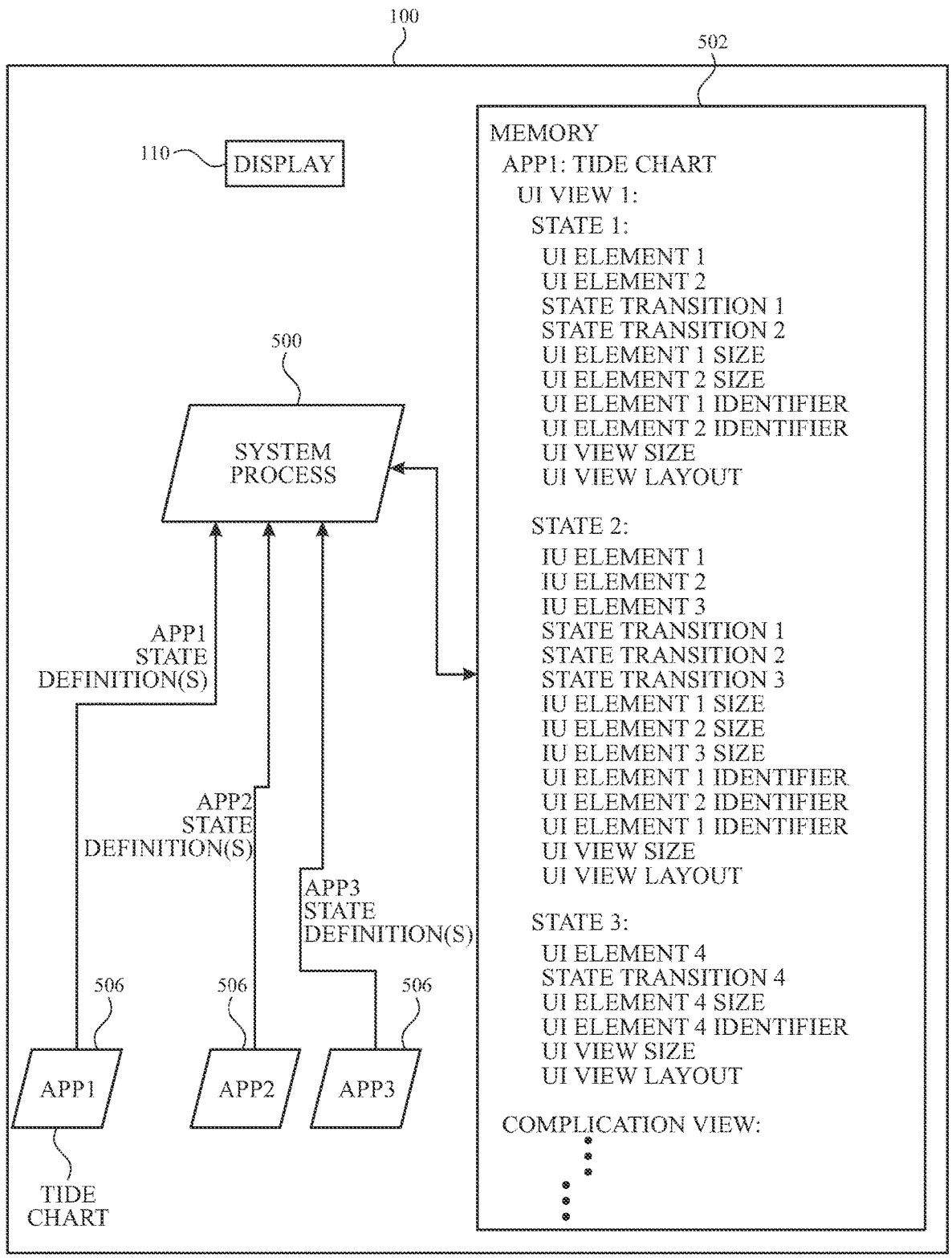
FIG. 5 illustrates a block diagram of an example electronic device obtaining application state information associated with application user interface views, in accordance with one or more implementations.

FIG. 5 illustrates an example architecture that may be implemented by the electronic device 100 in accordance with one or more implementations of the subject technology. For explanatory purposes, portions of the architecture of FIG. 5 is described as being implemented by the electronic device 100 of FIG. 1, such as by a processor and/or memory of the electronic device; however, appropriate portions of the architecture may be implemented by any other electronic device. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

Various portions of the architecture of FIG. 5 can be implemented in software or hardware, including by one or more processors and a memory device containing instructions, which when executed by the processor cause the processor to perform the operations described herein. In the example of FIG. 5, the electronic device 100 includes hardware components such as display 110 and memory 502. In this example, the electronic device 100 also includes one or more logical process such as a system process 500, and/or one or more applications 506. For example, the system process 500 and/or the one or more applications 506 may be logical processes that are executed from the memory 502 by one or more processors of the electronic device 100. The system process 500 may be, for example, a process defined in hardware and/or as part of an operating system of the electronic device 100.

In the example of FIG. 5, the electronic device 100 (e.g., memory 502) stores code for three applications 506 (e.g., "APP1", "APP2", and "APP3"). However, this is merely illustrative, and it is understood that the electronic device 100 can store code for one application 506, two applications 506, more than three application 506, or generally any number of applications 506. The applications 506 may, for example, have been previously downloaded to the electronic device 100 and installed at the electronic device 100. One or more of the applications 506 may be associated with a UI view or a complication view that displays application-specific content that can be periodically, occasionally, or continuously updated (e.g., application-specific information, system status information, and/or information associated with a physical world event as discussed herein), while the application 506 and/or a full user interface of the application 506 is inactive. The UI view and the complication view may display the application-specific content on the display 110 of electronic device 100. For example, as shown in FIG. 3, element 205 may comprise at least a portion of a complication view associated with application-specific content, and element 211 may comprise at least a portion of a UI view associated with the same application-specific content, different application-specific content, or partially the same application-specific content as the application-specific content shown in element 205. While FIG. 3 depicts electronic device 100 as a mobile phone, such as a smartphone, it is understood that UI views may be displayed on any suitable type of electronic device 100, such as a watch or other wearable device, a tablet, a personal computer, a laptop computer, a set-top box, a display device in a vehicle, or any other device. Likewise, it is understood that complication views may be displayed on suitable type of electronic device 100, such as a watch or other wearable device, a tablet, a personal computer, a laptop computer, a set-top box, a display device in a vehicle, or any other computing device.

For example, as shown in FIG. 5, one or more applications 506 can provide one or more state definitions for a UI view and a complication view to the system process 500. In this example, APP1 is associated with a tide chart application. For example, APP1 may be associated with the application-specific content rendered on the lock screen 250 UI presented in elements 205, 207, 209, and 213 in FIG. 3. In one example, APP1 may provide state information associated with a UI view to render element 213 in FIG. 3, and APP1 may provide state information associated with a complication view to render elements 205, 207, and 209 in FIG. 3. In one example, APP1 provides one or more APP1 STATE DEFINITIONS, for one or more respective states of a corresponding UI view for the APP1 tide chart, to the system process 500. Though not shown, APP1 may provide one or more additional APP1 STATE DEFINITIONS for one or more respective states of a corresponding complication view for the APP1 tide chart, to the system process 500. As illustrated in FIG. 5, the system process 500 may store the state definitions provided by APP1 in the memory 502 in association with APP1 (e.g., in an archive of state definitions).

In addition to the UI view and the complication view presented in connection with the APP1—e.g., the tide chart application—one or more additional applications may also provide state definitions for their respective UI views and/or complication views to the system process 500 for storage in memory 502 in association with the application (e.g., APP2 can provide APP2 state definitions and APP3 can provide APP3 state definitions to the system process 500 for storage in memory 502 in association with those respective applications 506).

In the example of FIG. 5, the APP1 state definitions provided from APP1 to the system process 500 include the information to be used by the system process 500 to display one or more of the UI view of element 213 or the complication view of elements 205, 207, and 209 of FIG. 3. For example, as shown in FIG. 5, the APP1 state definitions may include, for a first UI view (e.g., UI VIEW 1, corresponding to the UI view described in FIG. 3), definitions of the first state (e.g., STATE 1) of the UI view. Additionally, though not shown in FIG. 3, the UI view may be updated to a different state (e.g., STATE 2 or STATE 3) and a different element (not shown) may be rendered in place, or in addition to element 213. Furthermore, though not shown, the APP1 state definitions may include, for the complication view, definitions of the first state of the complication view.

In an example, the state definitions for UI VIEW 1 (e.g., the UI view described in, for example, element 213) may include definitions of one or more UI elements of the UI view, definitions of one or more UI state transitions for the UI view, definitions of sizes for one or more of the UI elements of the UI view, identifiers for one or more of the UI elements of the UI view, a size of the UI view, and/or a layout of the UI view (e.g., a layout of the UI elements relative to other UI elements, a border, a background, etc.). For example, for the state of the UI view described in FIG. 3, the system process 500 may receive, and the memory 502 may store, a definition of the element 213 (e.g., the UI ELEMENT 1) and a definition of a second element (not shown in FIG. 3), a definition of the transition of the element 213 from a first state to another state (e.g., STATE TRANSITION 1), a size of the element 213 (e.g., UI ELEMENT 1 SIZE) in the first state, an identifier of the element 213 (e.g., UI ELEMENT 1 IDENTIFIER), and/or a layout of the UI view shown in FIG. 3 (e.g., UI VIEW LAYOUT). The UI VIEW LAYOUT may define the locations of the element 213 within and relative to the other elements of the UI view (as an example).

In one example, the state definitions for COMPLICATION VIEW (e.g., the complication view described in, for example, one or more of elements 205, 207, and 209) may include definitions of one or more elements of the complication view, definitions of one or more UI state transitions for the complication view, definitions of sizes for the one or more of the elements of the complication view, identifiers for one or more of the elements of the complication view, a size and/or a layout of the complication view (e.g., a layout of the elements relative to other elements of the complication view, a border, a background, or other UI elements presented on the lock screen 250). For example, for the state of the complication view described in FIG. 3, the system process 500 may receive, and the memory 502 may store, a definition of the elements 205, 207, and 209, a definition of the transition of one or more of the elements 205, 207, and 209 from a first state to another state, a size of one or more of the elements 205, 207, and 209 in the first state, an identifier of one or more of the elements 205, 207, and 209, and/or a layout of the complication view shown in FIG. 3 (e.g., COMPLICATION VIEW). The complication view layout may define the locations of one or more of the elements 205, 207, and 209 within and relative to the other elements of the complication view (as an example).

UI ELEMENT 1 may define a graphical object for display in element 213, an update rate for the application-specific content associated with the element, and/or the color, background, and/or one or more other visual aspects of the element 213. Though not shown, a similar definition may be stored in the memory to define one or more graphical objects for display in elements 205, 207, and 209, an update rate for the application-specific content associated with the one or more elements, and/or the color, background, and/or one or more other visual aspects of the elements 205, 207, and 209.

The STATE TRANSITION 1 may define, for example, an animation type (e.g., blur in, blur out, translate in, translate out, fade in, fade out, particle-ize, snap, balloon, rotate, spin, flash, etc.) of an animation for the transition of the element 213 from the first state to another state. Though not shown, a similar definition may be stored in the memory to define, for example, an animation type of an animation for the transition of one or more of the elements 205, 207, and 209 from a first state to another state.

In the example of FIG. 5, only the contents of the APP1 state definitions for UI VIEW 1 (e.g., the UI view shown in FIG. 3) are visible. However, the system process 500 may receive, and/or the memory 502 may store, state definitions for additional states for UI VIEW 1, additional states for other UI views associated with the same application 506, additional states for the COMPLICATION VIEW, and/or state definitions for one or more other UI views and complication views associated with other applications (e.g., APP2, APP3, etc.).

In one or more implementations, the applications 506 may provide the state definitions to the system process 500 via a template (e.g., a single template or multiple templates can be used). In one or more implementations, the applications 506 may provide the state definitions to the system process 500 via an application programming interface (API). In one or more implementations, the applications 506 may provide the state definitions to the system process 500 via a file system (e.g., an application 506 may store the state definitions) in a template and save the template in a known directory that is parsed by the system process 500 (e.g., the definitions may be saved as a resource file for the application, etc.). In one or more implementations, the applications 506 may provide the state definitions to the system process 500 by a combination of one or more templates and one or more API calls. In one or more implementations, a template may have a format consumable by the system process 500 for rendering at least one UI view and/or one complication view in accordance with information included in the template.

The providing of the state definitions illustrated in FIG. 5 may be performed in advance of the rendering of the visual representation of the application-specific content (for which the state definitions define one or more states), so that the system process 500 of the electronic device 100 can render the corresponding visual representation having the application-specific content, the layout, the size, and/or other visual features of the UI view and/or the complication view in any of the various states defined in the state definitions for at least a period of time while the application itself is inactive.

Figure 6:
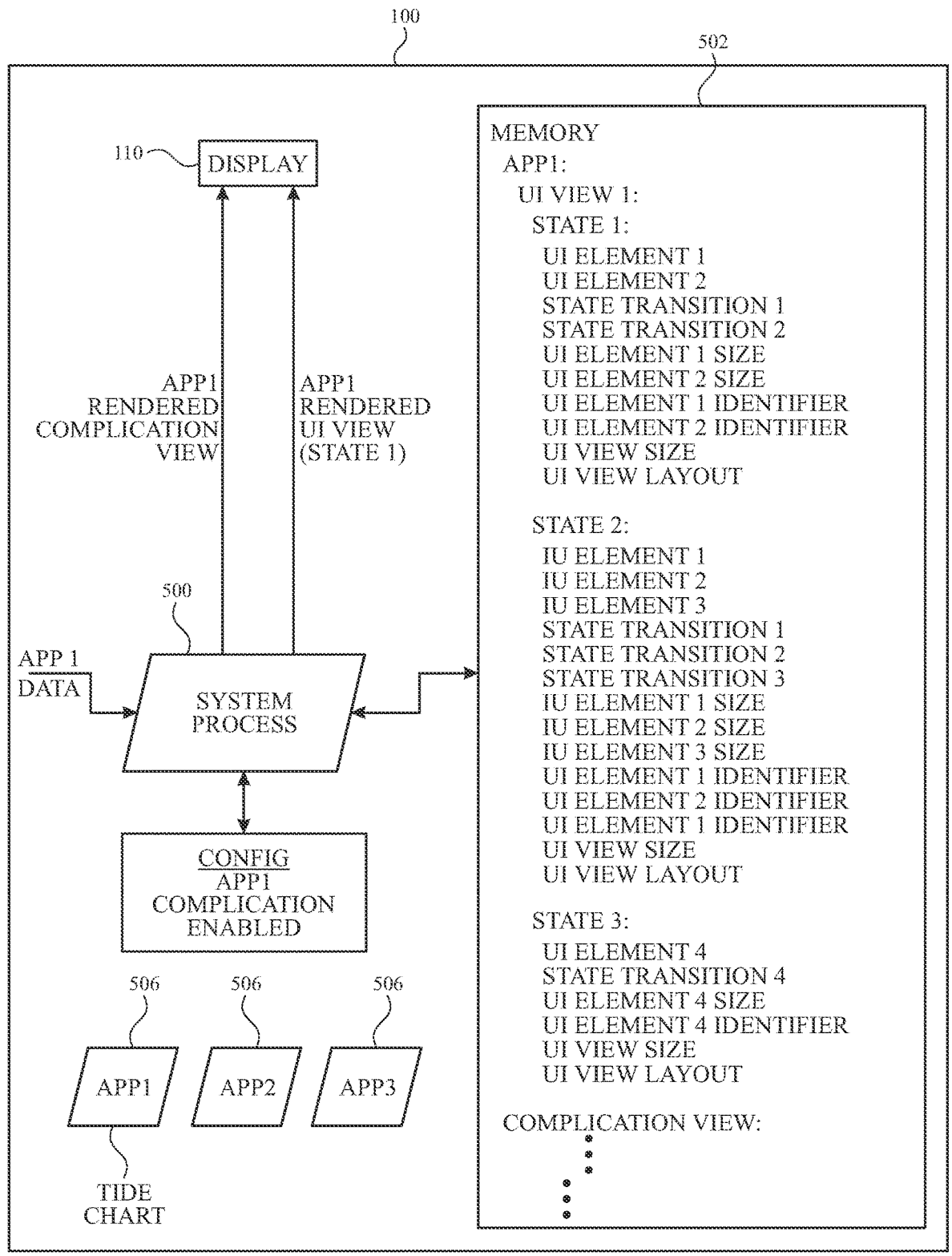
FIG. 6 illustrates a block diagram of an example electronic device obtaining one or more rendered user interface views associated with an application, in accordance with one or more implementations.

As shown in FIG. 6, the applications 506 of the electronic device 100 may be inactive while the system process 500 renders the UI view and the complication view for display by the display 110 of the electronic device 100. In one example, the system process 500 obtains the state information previously provided by APP1 for STATE 1 for UI VIEW 1 for APP1 from the memory 502, and renders the APP1 RENDERED UI VIEW for that state using the obtained state definition. The system process 500 provides the APP1 RENDERED UI VIEW to the display 110 for display as a visual representation of the application-specific content provided to the system process 500.

As shown in FIG. 6, the system process 500 communications with a configuration module. The configuration module determines, for example, based on a user input, to enable a complication associated with an application installed on the electronic device 100. For example, the APP1 complication view is enabled. The system process 500 determines the APP1 complication view is enabled and renders the complication view on the display 110 to present the visual representation of the application-specific content associated with the APP1 complication view. While enabled, the APP1 complication view may be persistently presented on the display 110.

Also shown in FIG. 6, the system process 500 obtains the state information previously provided by APP1 for the COMPLICATION VIEW from the memory 502, and renders, based on determining the APP1 complication view is enabled, the APP1 RENDERED COMPLICATION VIEW using the corresponding definition obtained from the memory. The system process 500 provides the APP1 RENDERED UI VIEW to the display 110 for display as a visual representation of the application-specific content provided to the system process 500. For example, the APP1 complication view will be presented persistently on the display 110, such as on the lock screen 250 described in FIGS. 2 and 3.

In one or more implementations, the system process 500 may determine, based on communication with the configuration module, that the APP1 complication is disabled and that an APP2 complication is enabled. Based on determining the APP1 complication is disabled, the system process 500 may not cause the APP1 RENDERED COMPLICATION VIEW to be rendered, and based on determining the APP2 complication is enabled, the system process 500 may cause a complication view associated with APP2 to be rendered at the display 110.

As shown in FIG. 6, the system process 500 may also receive APP1 DATA corresponding to APP1. The system process 500 may include some or all of the APP1 DATA in the APP1 RENDERED UI VIEW, and the system process 500 may include some or all of the APP1 DATA in the APP1 RENDERED COMPLICATION VIEW. The APP1 DATA may be received from APP1 and/or from a server that is remote from the electronic device 100 and associated with APP1. For example, in or with the state definition(s) provided from the applications 506 to the system process 500, the applications 506 may provide one or more links to communication channels for system process access to the APP1 data. For example, the system process 500 may use the one or more links to subscribe to one or more publication channels by which the applications 506 publish application-related dynamic content. The publication channels may be hosted by one or more servers associated with the applications 506. In this way, the system process 500 can receive APP1 DATA from a server associated with APP1, while APP1 is inactive at the electronic device.

In addition to the application-specific content to be included in at least one of the APP1 RENDERED UI VIEW and the APP1 RENDERED COMPLICATION VIEW, the APP1 DATA may also include modification information. The modification information may be included with the application-specific content (such as the APP1 DATA) and indicate whether the application-specific content should be modified. For example, the application-specific content and the APP1 DATA may be received by the system process 500 from the, for example, publication channel on the one or more servers associated with an application 506. The modification information may indicate that the application-specific content should be modified for presentation as part of the APP1 RENDERED COMPLICATION VIEW on the display 110. The APP1 RENDERED UI VIEW may include at least a portion of the application-specific content unmodified based on the modification information.

The system process 500 may receive first application-specific content, for example, the system process 500 may receive the first application-specific content via the one or more servers. The system process 500 may also receive modification information associated with the application-specific data, wherein the modification information indicates whether the application-specific data should be modified based on system state information of the electronic device 100. In one example, the system process 500 determines, based on the modification information, the application-specific content is to be modified based on the system state information of the electronic device 100. The system process 500 may determine, based on the modification information, that the application-specific content is to be rendered in a complication view associated with the lock screen 250 UI. The complication view may include a visual representation of the application-specific content modified according to the system state information. For example, the application-specific content may be modified according to a color associated with the electronic device 100, a color associated with a user profile associated with the electronic device 100, a privacy state of the electronic device 100, a time of day, an amount of ambient light, a font associated with other content displayed on a display 110 of the electronic device 100, or any other suitable feature.

In one example, the rendering the complication view of the application-specific content comprises obtaining the system state information associated with the electronic device 100, modifying the application-specific content based on the system state information, and rendering, by the renderer, the modified application-specific content.

In one example, the rendering the complication view of the application-specific content comprises obtaining the system state information associated with the electronic device 100, and rendering the application-specific content based on the obtained system state information.

In one or more examples, the modification information may indicate a first portion of the application-specific content to be modified based on the system state information and a second portion of the application-specific content that is not to be modified based on the system state information. According to the modification information, the system process 500 may cause the first portion of the application-specific content to be modified based on the system state information, and the system process 500 may cause the second portion of the application-specific content to be rendered without modification. The first and second portions of the application-specific content may be rendered on a same UI, such as the lock screen 250. For example, the application-specific content associated with element 205 may include modification information associated with the content to be rendered as a triangular shape, but the application-specific content may not include modification information associated with the content to be rendered as the textual content. Accordingly, element 205 may be rendered on the lock screen 250 UI wherein the triangular shape is modified according to the system state information, while the textual content is not modified according to the system state information. In one example, an entity associated with APP1 506 may determine that the entire portion of the application-specific content is to be modified, and the entity may determine the first portion of the application-specific content that is to be modified and the second portion of the application-specific content that is not to be modified.

In one example, the system process may be associated with multiple renderers. For example, a first renderer may be able to render a first portion of the application-specific content that is to be modified based on the system state information, while a second renderer may be able to render the second portion of the application-specific content that is not to be modified based on the system state information. In another example, the system process may be associated with a single renderer. The single renderer may be able to render both the first portion of the application-specific content, modified based on the system state information, and the second portion of the application-specific content without modification.

In another example, the system process 500 may cause the application-specific data to be rendered on the display 110 as the APP1 RENDERED COMPLICATION VIEW, and the application-specific content may be modified based on the system state information. The system process 500 may determine an update to the system state information. The system process 500 may cause the APP1 RENDERED COMPLICATION VIEW to be updated and/or re-rendered based on the updated system state information.

In one example, the APP1 RENDERED UI VIEW and the APP1 RENDERED COMPLICATION VIEW may be rendered by a same renderer or may be rendered by two different renderers. APP1 RENDERED UI VIEW and the APP1 RENDERED COMPLICATION VIEW may be rendered and simultaneously displayed on the display 110 of the UI, such as the Lock Screen 250.

In one example, the APP1 RENDERED UI VIEW is associated with a physical world event (e.g., a sporting game). The APP1 RENDERED UI VIEW may be periodically updated and/or re-rendered based on receiving, by the system process 500, of updated application-specific content associated with the APP1 RENDERED UI VIEW. The system process 500 may receive an indication that the physical world event has concluded (e.g., the sporting game ended), and the system process 500 may cause the APP1 RENDERED UI VIEW to be removed from the UI, such as the Lock Screen 250.

Figure 7:
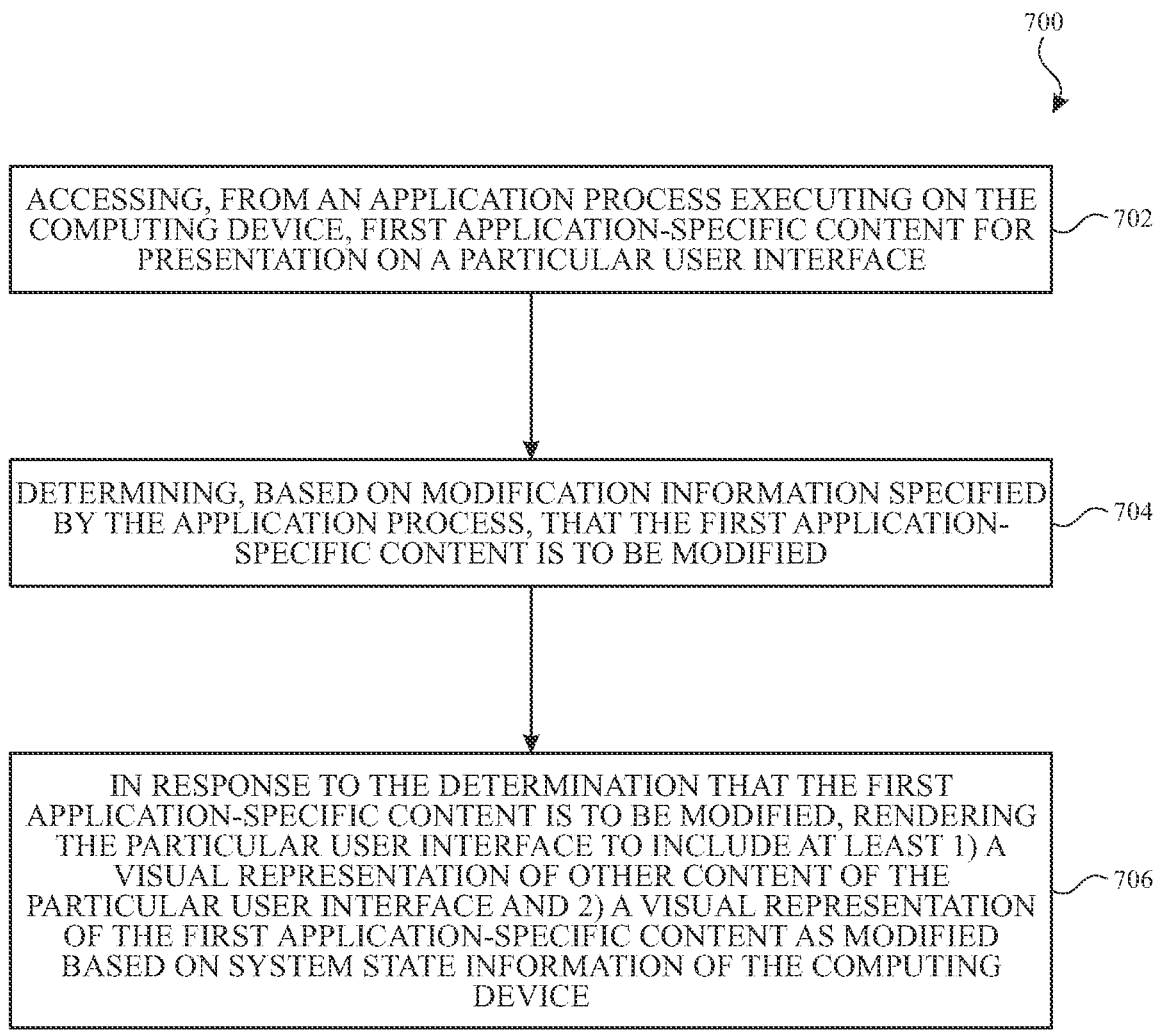
FIG. 7 illustrates a flow diagram of an example method for presenting modified application-specific content on a user interface view according to one or more implementations.

FIG. 7 illustrates a flow diagram of an example process for rendering user interfaces using templates, according to aspects of the subject technology. The blocks of process 700 are described herein as occurring in serial, or linearly. However, multiple blocks of process 700 may occur in parallel. In addition, the blocks of process 700 need not be performed in the order shown and/or one or more blocks of process 700 need not be performed and/or can be replaced by other operations. In some embodiments, a system process (e.g., system process 500) of an operating system of an electronic device performs the process of FIG. 7. In some implementations, the system process is a user interface view display process (e.g., a process for displaying widgets, etc.). In other embodiments, a user interface view display process (e.g., a process for displaying widgets, etc.) separate from an operating system of the electronic device performs the process of FIG. 7.

In the example of FIG. 7, at block 702, a system process (e.g., system process 500) of a computing device (e.g., electronic device 100) may access, from an application process executing on the computing device (e.g., an application 506, such as APP1) first application-specific content for presentation on a particular user interface (e.g., a Lock Screen 250). In one or more implementations, the particular user interface may be a particular user interface for a widget for the application.

At block 704, the application process may determine, based on modification information specified by the application process, that the first application-specific content is to be modified. As described, the modification information may instruct a renderer to modify none of the application-specific content, some of the application-specific content, or all of the application-specific content accessed by the system process.

At block 706, in response to determining that the first application-specific content is to be modified (e.g., according to the system state information), the system process (e.g., system process 500) causes the particular user interface to be rendered, and the particular user interface includes 1) a visual representation of other content of the particular user interface and 2) a visual representation of the first application-specific content as modified based on system state information of the computing device. For example, the other content of the particular user interface may be other content not associated with the application-specific content. For example, the other content may be a time 208 and a date 210 to be rendered on the particular user interface. The application-specific content may be modified according to system state information associated with the computing device.

Figure 8:
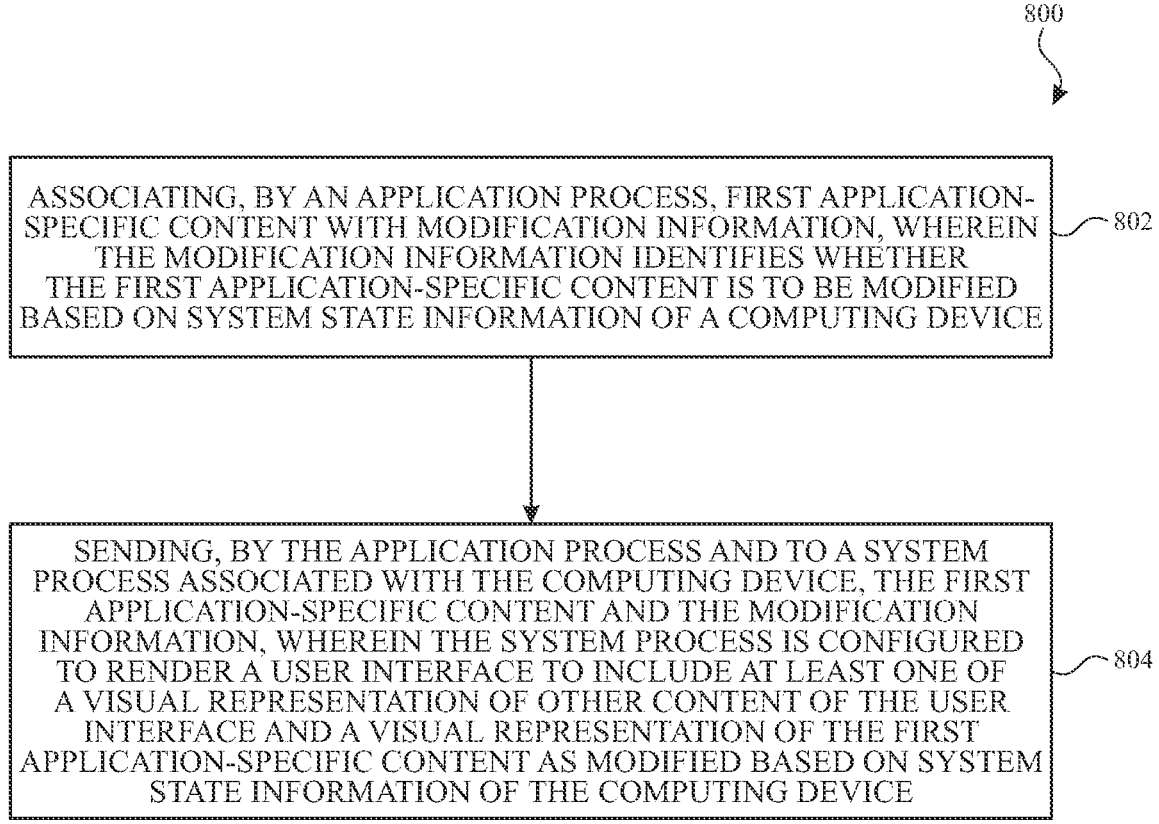
FIG. 8 illustrates a flow diagram of an example method for sending application-specific content and modification information to a system process of an electronic device.

FIG. 8 illustrates a flow diagram of an example process for sending application-specific content, by an application, to a computing device to cause the application-specific content to be rendered at the computing device, according to aspects of the subject technology. The blocks of process 800 are described herein as occurring in serial, or linearly. However, multiple blocks of process 800 may occur in parallel. In addition, the blocks of process 800 need not be performed in the order shown and/or one or more blocks of process 800 need not be performed and/or can be replaced by other operations.

In the example described in FIG. 8, at block 802, an application process (e.g., APP1, APP2, or APP3 506 in FIG. 5) associates first application-specific content (e.g., APP1 DATA) with modification information (e.g., received by the system process 500 with the APP1 DATA), wherein the modification information identifies whether the first application-specific content is to be modified based on system state information of a computing device (e.g., electronic device 100).

At block 804, the application process (e.g., APP1 506) sends, to a system process (e.g., system process 500) associated with the computing device (e.g., electronic device 100), the first application-specific content and the modification information (e.g., APP1 DATA) associated with the application-specific content. The system process (e.g., system process 500) is configured to render a user interface (e.g., APP1 RENDERED UI VIEW and APP1 Rendered Complication View) on the computing device to include at least one of a visual representation of other content of the user interface and a visual representation of the first application-specific content as modified based on system state information of the computing device.

As described above, aspects of the subject technology may include the collection and transfer of data from an application to other users' computing devices. The present disclosure contemplates that in some instances, this collected data may include personal information data that uniquely identifies or can be used to identify a specific person. Such personal information data can include demographic data, location-based data, online identifiers, telephone numbers, user activity data, user power consumption data, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used in providing content on an electronic device. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of providing dynamic lock screen content on an electronic device, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 9:
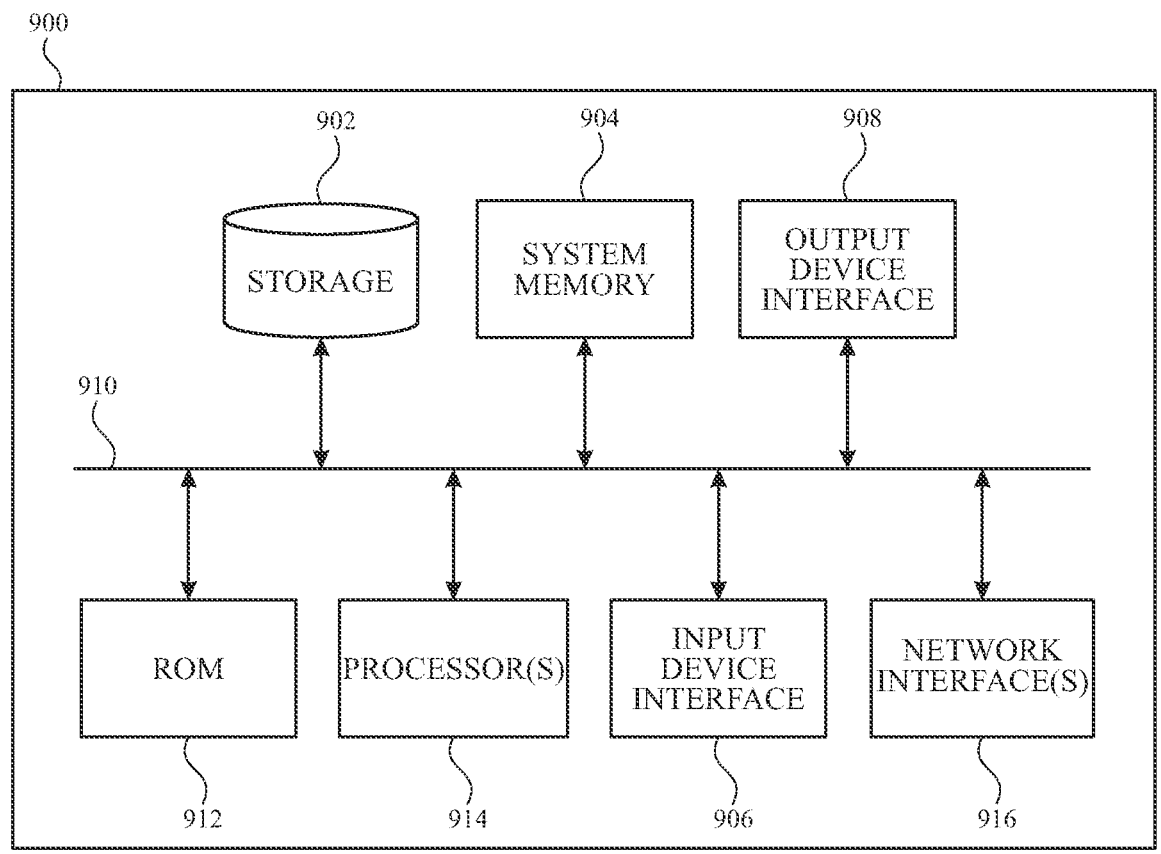
FIG. 9 illustrates an example computing device with which aspects of the subject technology may be implemented.

FIG. 9 illustrates an example computing device with which aspects of the subject technology may be implemented in accordance with one or more implementations. The computing device 900 can be, and/or can be a part of, any computing device or server for generating the features and processes described above, including but not limited to a laptop computer, a smartphone, a tablet device, a wearable device such as smart watch, and the like. The computing device 900 may include various types of computer readable media and interfaces for various other types of computer readable media. The computing device 900 includes a permanent storage device 902, a system memory 904 (and/or buffer), an input device interface 906, an output device interface 908, a bus 910, a ROM 912, one or more processing unit(s) 914, one or more network interface(s) 916, and/or subsets and variations thereof.

The bus 910 collectively represents all system, peripheral, and chipset buses that communicatively connect the numerous internal devices of the computing device 900. In one or more implementations, the bus 910 communicatively connects the one or more processing unit(s) 914 with the ROM 912, the system memory 904, and the permanent storage device 902. From these various memory units, the one or more processing unit(s) 914 retrieves instructions to execute and data to process in order to execute the processes of the subject disclosure. The one or more processing unit(s) 914 can be a single processor or a multi-core processor in different implementations.

The ROM 912 stores static data and instructions that are needed by the one or more processing unit(s) 914 and other modules of the computing device 900. The permanent storage device 902, on the other hand, may be a read-and-write memory device. The permanent storage device 902 may be a non-volatile memory unit that stores instructions and data even when the computing device 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random access memory. The system memory 904 may store any of the instructions and data that one or more processing unit(s) 914 may need at runtime. In one or more implementations, the processes of the subject disclosure are stored in the system memory 904, the permanent storage device 902, and/or the ROM 912. From these various memory units, the one or more processing unit(s) 914 retrieves instructions to execute and data to process in order to execute the processes of one or more implementations.

The bus 910 also connects to the input and output device interfaces 906 and 908. The input device interface 906 enables a user to communicate information and select commands to the computing device 900. Input devices that may be used with the input device interface 906 may include, for example, alphanumeric keyboards and pointing devices (also called "cursor control devices"). The output device interface 908 may enable, for example, the display of images generated by computing device 900. Output devices that may be used with the output device interface 908 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 9, the bus 910 also couples the computing device 900 to one or more networks and/or to one or more network nodes through the one or more network interface(s) 916. In this manner, the computing device 900 can be a part of a network of computers (such as a LAN, a wide area network ("WAN"), or an Intranet, or a network of networks, such as the Internet. Any or all components of the computing device 900 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components (e.g., computer program products) and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
by a system process executing on a computing device:
accessing, from an application process executing on the computing device:
first application-specific content for presentation on a particular user interface; and
modification information specified by the application process for the first application-specific content;
determining, based on the modification information specified by the application process, that at least a first portion of a visual representation of the first application-specific content is to be modified based on system state information of the computing device; and
in response to the determination that the at least the first portion of the visual representation of the first application-specific content is to be modified, rendering the particular user interface to include at least 1) a visual representation of other content of the particular user interface and 2) the visual representation of the first application-specific content with at least the first portion modified based on the system state information of the computing device.

2. The method of claim 1, further comprising:
accessing, from the application process, second application-specific content for presentation within a UI view, wherein the rendered particular user interface includes: 1) the visual representation of the other content of the particular user interface, 2) the visual representation of the first application-specific content with at least the first portion modified by the system state information, and 3) a visual representation of the UI view that includes the second application-specific content, wherein the system process uses a first rendering process for the first application-specific content, and wherein the system process uses a different, second rendering process for the visual representation of the UI view.

3. The method of claim 1,
wherein the modification information indicates that the at least the first portion of the visual representation of the first application-specific content is to be modified, and
wherein rendering the particular user interface comprises:
obtaining the system state information;
modifying the at least the first portion of the visual representation of the first application-specific content based on the obtained system state information; and
rendering the modified at least the first portion of the visual representation of the first application-specific content.

4. The method of claim 1,
wherein the modification information indicates that the at least the first portion of the visual representation of the first application-specific content is to be modified, and
wherein rendering the particular user interface comprises:
obtaining the system state information; and
rendering the at least the first portion of the visual representation of the first application-specific content based on the system state information.

5. The method of claim 1, wherein the system state information identifies attributes of a theme associated with a lock screen UI.

6. The method of claim 1, wherein the system state information identifies one or more of: a color, a privacy state associated with a lock screen, a time of day, ambient light, or a font of the other content presented on the particular user interface.

7. The method of claim 1, further comprising:
accessing, from a second application process executing on the computing device, second application-specific content for presentation on the particular user interface; and
rendering the particular user interface to include at least a visual representation of the second application-specific content.

8. The method of claim 1, wherein the system process receives user input updating a theme associated with the particular user interface, the method further comprising:
rendering an updated particular user interface to include at least the visual representation of the first application-specific content with the at least the first portion of the visual representation of the first application-specific content modified based on the updated theme.

9. The method of claim 1, further comprising:
receiving, by the system process, user input indicating a selection of the visual representation of the first application-specific content; and
causing, by the system process and in response to the user input, a redirection from the particular user interface to a different user interface associated with the visual representation of the first application-specific content.

10. The method of claim 1, wherein the visual representation of the first application-specific content comprises at least one of: a rectangular user interface, a circular user interface, a curved user interface, or an edge user interface.

11. The method of claim 1,
wherein the modification information indicates that the first portion of the visual representation of the first application-specific content is to be modified and that a second portion of the first application-specific content is not to be modified, and
wherein rendering the particular user interface comprises rendering the particular user interface to include at least 1) the visual representation of the other content of the particular user interface, 2) the visual representation of the first application-specific content with the first portion modified based on the system state information of the computing device, and an unmodified visual representation of the second portion of the first application-specific content.

12. The method of claim 11, wherein the other content is unassociated with the application-specific content.

13. A method comprising:
associating, by an application process, first application-specific content with modification information for the first application-specific content, wherein the modification information identifies whether the first application-specific content is to be modified based on system state information of a computing device; and
sending, by the application process and to a system process associated with the computing device, the first application-specific content and the modification information, wherein the system process is configured to render a user interface to include at least 1) a visual representation of other content of the user interface and 2) a visual representation of the first application-specific content as modified based on the system state information of the computing device.

14. The method of claim 13, wherein the user interface is a lock screen user interface.

15. The method of claim 13, further comprising sending, by the application process and to the system process, second application-specific content for presentation within a UI view,
wherein the system process is configured to render the user interface to include at least a visual representation of the UI view that includes the second application-specific content.

16. A non-transitory computer-readable medium storing instructions that, when executed, cause:
accessing, by a system process executing on a computing device, and from an application process executing on the computing device:
first application-specific content for presentation on a particular user interface; and
modification information specified by the application process for the first application-specific content;
determining, based on the modification information specified by the application process, that at least a first portion of a visual representation of the first application-specific content is to be modified based on system state information of the computing device; and
in response to the determination that the at least the first portion of the visual representation of the first application-specific content is to be modified, rendering the particular user interface to include at least 1) a visual representation of other content of the particular user interface and 2) the visual representation of the first application-specific content with at least the first portion modified based on the system state information of the computing device.

17. The non-transitory computer-readable medium of claim 16, wherein the instructions, when executed, further cause:
accessing, from the application process, second application-specific content for presentation within a UI view,
wherein the rendered particular user interface includes: 1) the visual representation of the other content of the particular user interface, 2) the visual representation of the first application-specific content with at least the first portion modified based on the system state information, and 3) a visual representation of the UI view that includes the second application-specific content, wherein the system process uses a first rendering process for the first application-specific content, and wherein the system process uses a different, second rendering process for the visual representation of the UI view.

18. The non-transitory computer-readable medium of claim 16,
wherein the modification information indicates that the at least the first portion of the visual representation of the first application-specific content is to be modified, and
wherein the instructions, when executed, cause rendering the particular user interface, further cause:
obtaining the system state information;
modifying the at least the first portion of the visual representation of the first application-specific content based on the obtained system state information; and
rendering the modified at least the first portion of the visual representation of the first application-specific content.

19. The non-transitory computer-readable medium of claim 16, wherein the system state information identifies one or more of: a color, a privacy state associated with a lock screen, a time of day, ambient light, or a font of other content presented on the particular user interface.

20. The non-transitory computer-readable medium of claim 16, wherein the instructions, when executed, further cause:
accessing, from a second application process executing on the computing device, second application-specific content for presentation on the particular user interface; and
rendering the particular user interface to include at least a visual representation of the second application-specific content.

21. The non-transitory computer-readable medium of claim 14, wherein the system process receives user input updating a theme associated with the particular user interface, and wherein the instructions, when executed, further cause:
rendering an updated particular user interface to include at least the visual representation of the first application-specific content with the at least the first portion of the visual representation of the first application-specific content modified based on the updated theme.

22. The non-transitory computer-readable medium of claim 16, wherein the instructions, when executed, further cause:

receiving, by the system process, user input indicating a selection of the visual representation of the first application-specific content; and causing, by the system process and in response to the user input, a redirection from the particular user interface to a different user interface associated with the visual representation of the first application-specific content.

\* \* \* \* \*